United States Patent [19]
Lam

[11] Patent Number: 5,810,419
[45] Date of Patent: Sep. 22, 1998

[54] GLARE SHIELD

[76] Inventor: Khanh Lam, 10513 E. Fieldcrest St., El Monte, Calif. 91731

[21] Appl. No.: 899,139

[22] Filed: Jul. 23, 1997

[51] Int. Cl.$^6$ ............................................. B60J 3/00
[52] U.S. Cl. ........................................ 296/97.1; 296/97.9
[58] Field of Search ................... 296/97.1, 97.2, 296/97.7, 97.9, 97.6

[56] References Cited

U.S. PATENT DOCUMENTS

| 3,133,139 | 5/1964 | Beers | 296/97.2 |
| 5,150,258 | 9/1992 | Schmidt et al. | 296/97.1 |

FOREIGN PATENT DOCUMENTS

| 1544134 | 10/1968 | France | 269/97.1 |
| 575011 | 3/1957 | Italy | 296/97.6 |

*Primary Examiner*—Gary C. Hoge

[57] ABSTRACT

The glare shield of the present invention includes a transparent shield that is polarized or tinted to reduce glare. This shield is pivotally secured to a rearview mirror by way of a first and second bracket. Each of the brackets includes a hinge piece and the shield includes two hinge pieces. These hinge pieces combine to pivotally secure the glare shield to the brackets. Additionally, magnets are secured to both the brackets and the glare shield. By way of the magnets, the glare shield can be kept in an upright orientation.

4 Claims, 3 Drawing Sheets

GLARE SHIELD

BACKGROUND OF THE INVENTION

1. Field of the Invention

The present invention relates to a glare shield and more particularly pertains to such a shield which is pivotally secured to a rearview mirror.

2. Description of the Prior Art

The use of a rearview mirrors is known in the prior art. More specifically, rearview mirrors are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,958,879 to Gillum discloses an auto sun visor. U.S. Pat. No. 4,352,519 to Aro discloses a latching glare shield. U.S. Pat. No. 292,689 to Espinoza discloses a combined multi section rear view mirror and anti glare visor. U.S. Pat. No. 5,127,700 to Joe et al discloses a rear view mirror and sun visor assembly for a vehicle. U.S. Pat. No. 5,150,258 to Schmidt discloses a combination mirror and sun visor. Lastly, U.S. Pat. No. 4,974,896 to Konishi discloses an auxiliary visor.

In this respect, the glare shield of the present invention substantially departs from the conventional concepts and designs of the prior art, and in so doing provides an apparatus primarily developed for the purpose of enabling a user to selectively cover a rearview mirror with a glare shield.

Therefore, it can be appreciated that there exists a continuing need improvements in rearview mirrors. In this regard, the present invention substantially fulfills this need.

SUMMARY OF THE INVENTION

In view of the foregoing disadvantages inherent in the known types of rearview mirrors now present in the prior art, the present invention provides a means for reducing the glare produced by such a rearview mirror. When the glare shield is kept in an upright orientation it will act as a sun blocker.

To attain this, the present invention essentially comprises a glare prevention shield adapted to be secured over a rearview mirror. The shield includes a first bracket having an upper portion and a lower portion and an intermediate extent therebetween, a first hinge piece positioned at the upper extent, an aperture positioned within the lower portion, a magnet positioned upon the upper portion of the first bracket. The shield also includes a second bracket having an upper portion and a lower portion and an intermediate extent therebetween, a second hinge piece is positioned at the upper extent, and an aperture is positioned within the lower portion, a magnet positioned upon the upper portion of the second bracket. The first and second brackets are adapted to be secured to a rearview mirror with the upper portions of the brackets positioned at an upper extent of the rearview mirror. A first securing means is positioned within the aperture of the first bracket, the first securing means includes a threaded screw and a bottom plate adjustably positioned upon the threaded screw, the bottom plate being adjusted to engage a lower extent of the rearview mirror. A second securing means is positioned within the aperture of the second bracket. The second securing means includes a threaded screw and a bottom plate adjustably positioned upon the threaded screw, the bottom plate being adjusted to engage the lower extent of the rearview mirror. The glare shield includes an upper edge, a lower edge and an intermediate extent therebetween. The first hinge piece, and corresponding magnet, are secured to the glare shield and adapted to be secured to the first hinge piece of the first bracket. A second hinge piece and corresponding magnet is secured to the glare shield and adapted to be secured to the second hinge piece of the second bracket. The glare shield is thus pivotally secured to the first and second brackets. The magnet of the first hinge piece is oriented to be secured to the magnet of the first bracket, additionally the magnet of the second hinge piece is oriented to be secured to the magnet of the second bracket, such that the glare shield can be magnetically held in an upright orientation.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved glare shield. The glare shield of the present invention includes a transparent shield that is polarized or tinted to reduce glare. This shield is pivotally secured to a rearview mirror by way of a first and second bracket. Each of the brackets includes a hinge piece and the shield includes two hinge pieces. These hinge pieces combine to pivotally secure the glare shield to the brackets. Additionally, magnets are secured to both the brackets and the glare shield. By way of the magnets, the glare shield can be kept in an upright orientation.

It is another object of the present invention to provide a means by which a user may selectively engage a glare shield of the present invention.

It is a further object of the present invention to provide a glare shield that may be used in conjunction with conventional rearview mirrors.

An even further object of the present invention is to provide a glare shield which is susceptible of a low cost of manufacture with regard to both materials and labor, and which accordingly is then susceptible of low prices of sale to the consuming public, thereby making such glare shield economically available to the buying public.

Still yet another object of the present invention is to provide a glare shield which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 1:
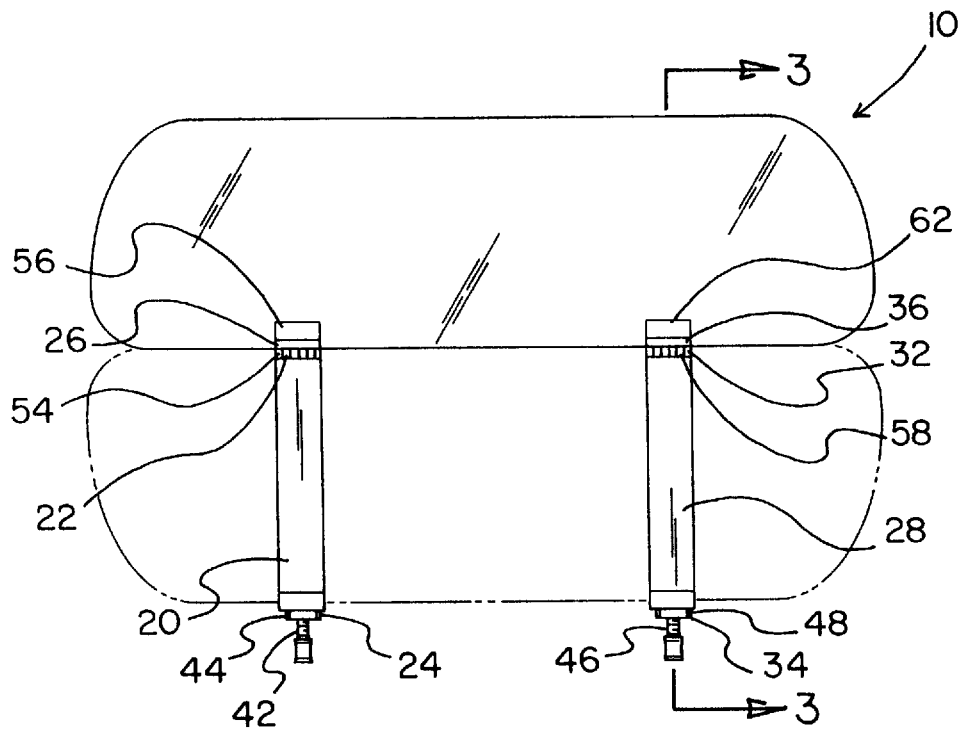
FIG. 1 is an elevational view of the shield in an engaged orientation.
Figure 2:
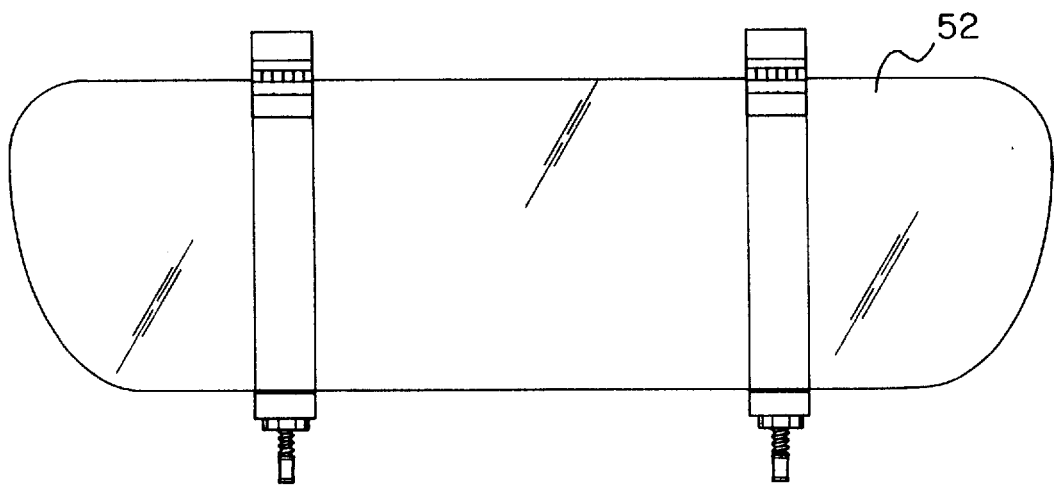
FIG. 2 is an elevational view of the shield in a disengaged orientation.

With reference now to the drawings, and in particular to FIG. 1 thereof, the glare prevention shield of the present invention is depicted. In its broadest context, the present invention includes a transparent glare shield which is pivotally secured to a rearview mirror. The various components of the present invention, and the manner in which they interrelate, will be described in greater detail hereinafter.

Figure 5:
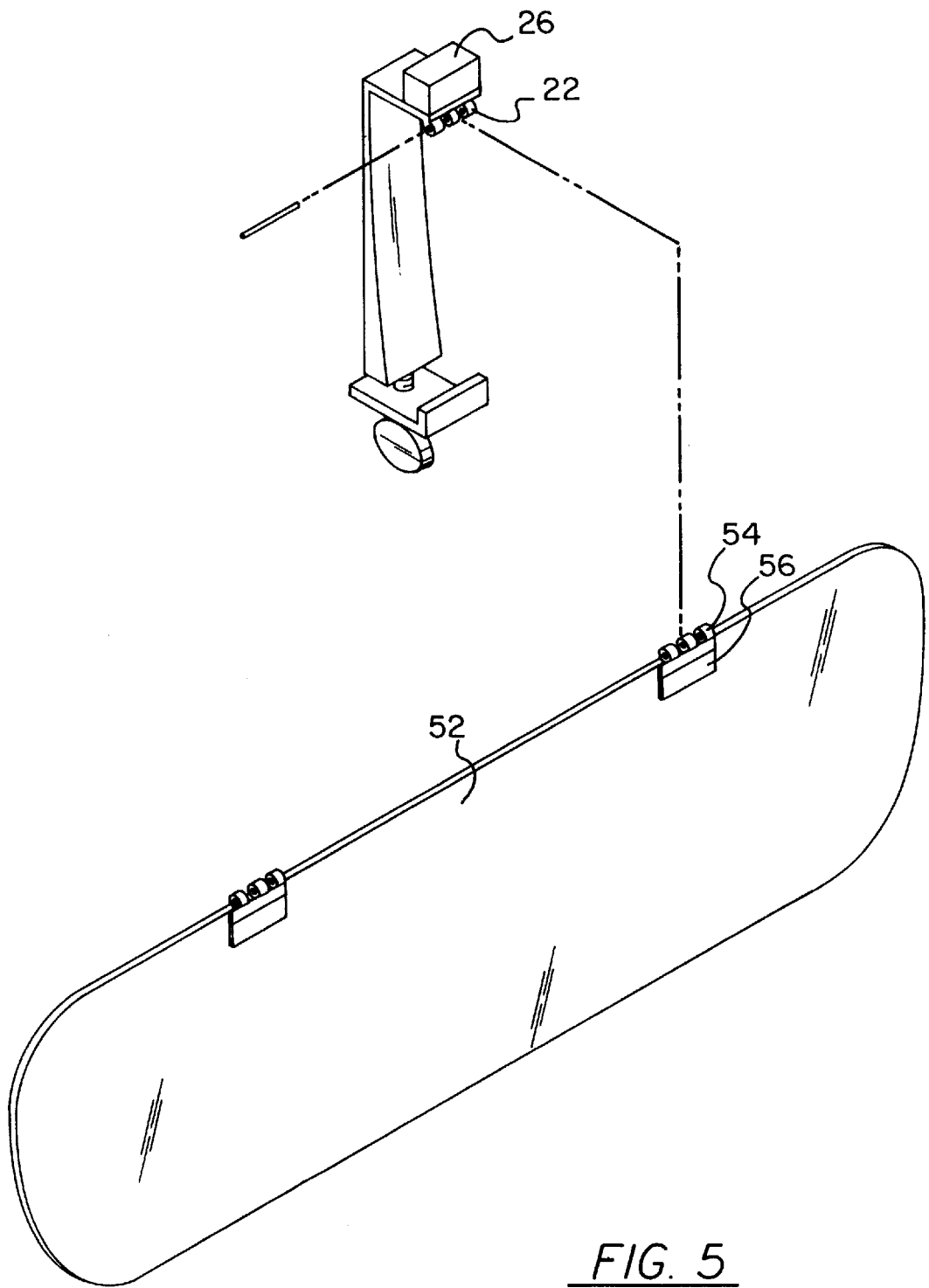
FIG. 5 is partially exploded view of the shield of the present invention.

The glare prevention shield of the present invention is adapted to be secured over a rearview mirror. More specifically, the shield is secured to the rearview mirror by way of first and second brackets. The first bracket 20 is defined by an upper portion and a lower portion with an intermediate extent therebetween. A first hinge piece 22 is positioned at the upper extent of the first bracket 20 and an aperture 24 is positioned within the lower portion. As is illustrated in FIG. 5, a magnet 26 positioned upon the upper portion of the first bracket 20. The function of this magnet will be described in greater detail hereinafter.

The second bracket 28 is likewise defined by an upper portion, a lower portion and an intermediate extent therebetween. A second hinge piece 32 is positioned at the upper extent of the second bracket 28. Furthermore, an aperture 34 is positioned within the lower portion of the second bracket 28. Additionally, a magnet 36 is positioned upon the upper portion of the second bracket 28. The function of this magnet will be described in greater detail hereinafter.

The first and second brackets are adapted to be secured to a rearview mirror 38 with the upper portions of the brackets positioned at an upper extent of the rearview mirror. Such an arrangement is illustrated in reference to FIG. 3.

A first securing means is positioned within the aperture of the first bracket. This first securing means includes a threaded screw 42 and a bottom plate 44 which is adjustably positioned upon the threaded screw 42. The bottom plate 44 can be adjusted to engage a lower extent of the rearview mirror 38 to thereby secure the first bracket 20 to the rearview mirror 38.

Likewise, a second securing means is positioned within the aperture of the second bracket 28. This second securing means includes a threaded screw 46 and a bottom plate 48 adjustably positioned upon the threaded screw 46. The bottom plate 48 can be adjusted to engage the lower extent of the rearview mirror 38 to thereby secure the second bracket 28 to the rearview mirror 38.

The glare shield 52 employed in conjunction with the present invention is made from a transparent material. In the preferred embodiment the shield 52 is polarized or tinted to reduce glare. The shield 52 is defined by an upper edge, a lower edge with an intermediate extent therebetween. A first hinge piece 54 and corresponding magnet 56 are secured to the glare shield 52. The first hinge piece 54 is adapted to be pivotally secured to the first hinge piece 22 of the first bracket 20. Additionally, a second hinge piece 58 and corresponding magnet 62 are secured to the glare shield 52. The second hinge piece 58 is adapted to be pivotally secured to the second hinge piece 32 of the second bracket 28. In this manner, the glare shield 52 is thus pivotally secured to the first and second brackets.

Figure 3:
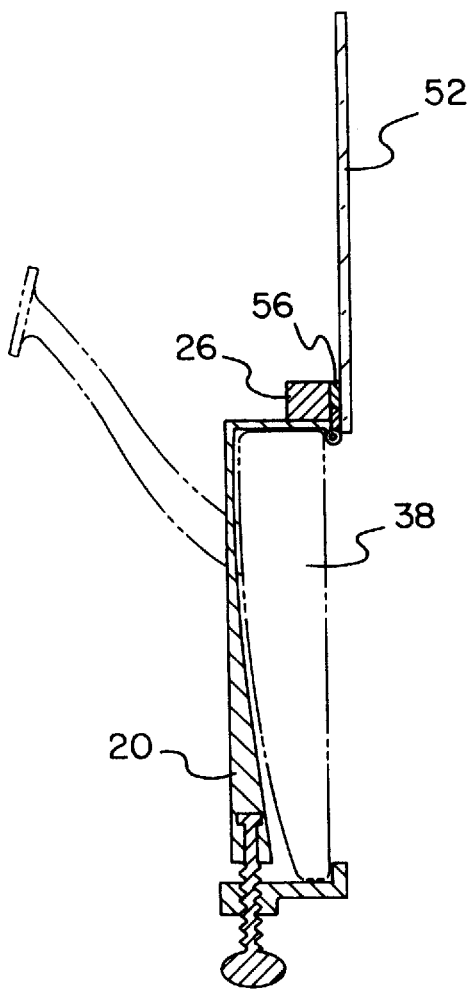
FIG. 3 is sectional view taken along line 3—3 of FIG. 1.
Figure 4:
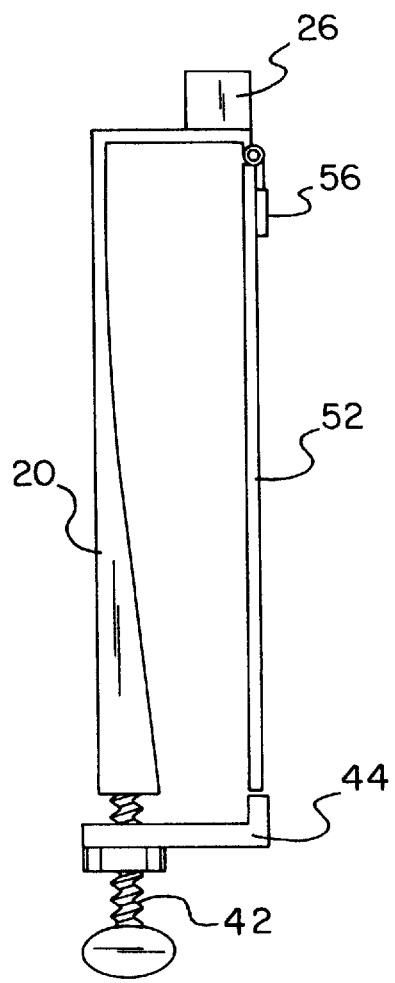
FIG. 4 is a side view of the shield of the present invention.

The magnet 56 of the first hinge piece 54 is oriented to be secured to the magnet 26 of the first bracket 20, additionally the magnet 62 of the second hinge piece 58 oriented to be secured to the magnet 36 of the second bracket 28. In this manner, the glare shield 52 can be magnetically held in an upright orientation. When the glare shield is kept in an upright orientation, as illustrated in FIG. 3, it will act as a sun blocker.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A glare prevention shield adapted to be secured over a rearview mirror, the shield comprising in combination:

a first bracket having an upper portion and a lower portion and an intermediate extent therebetween, a first hinge piece positioned at the upper extent, an aperture positioned within the lower portion, a magnet positioned upon the upper portion of the first bracket;

a second bracket having an upper portion and a lower portion and an intermediate extent therebetween, second hinge piece positioned at the upper extent, an aperture positioned within the lower portion, a magnet positioned upon the upper portion of the second bracket;

the first and second brackets adapted to be secured to a rearview mirror with the upper portions of the brackets positioned at an upper extent of the rearview mirror;

a first securing means positioned within the aperture of the first bracket, the first securing means including a threaded screw and a bottom plate adjustably positioned upon the threaded screw, the bottom plate being adjusted to engage a lower extent of the rearview mirror;

a second securing means positioned within the aperture of the second bracket, the second securing means including a threaded screw and a bottom plate adjustably positioned upon the threaded screw the bottom plate being adjusted to engage the lower extent of the rearview mirror;

a glare shield having an upper edge, a lower edge and an intermediate extent therebetween, a first hinge piece and corresponding magnet secured to the glare shield and adapted to be secured to the first hinge piece of the first bracket, a second hinge piece and corresponding magnet secured to the glare shield and adapted to be secured to the second hinge piece of the second bracket, the glare shield thus being pivotally secured to the first and second brackets, the magnet of the first hinge piece oriented to be secured to the magnet of the first bracket, additionally the magnet of the second hinge piece oriented to be secured to the magnet of the second bracket, such that the glare shield can be magnetically held in an upright orientation.

2. A glare prevention shield adapted to be secured over a rearview mirror, the shield comprising in combination:

a first bracket having an upper portion and a lower portion and an intermediate extent therebetween, a first hinge piece positioned at the upper extent, an aperture positioned within the lower portion;

a second bracket having an upper portion and a lower portion and an intermediate extent therebetween, second hinge piece positioned at the upper extent, an aperture positioned within the lower portion;

the first and second brackets adapted to be secured to a rearview mirror with the upper portions of the brackets positioned at an upper extent of the rearview mirror;

a first securing means positioned within the aperture of the first bracket;

a second securing means positioned within the aperture of the second bracket, the first and second securing means adapted to engage a lowermost portion of the rearview mirror;

a glare shield having an upper edge, a lower edge and an intermediate extent therebetween, a first hinge piece secured to the glare shield and adapted to be secured to the first hinge piece of the first bracket, a second hinge piece secured to the glare shield and adapted to be secured to the second hinge piece of the second bracket, the glare shield thus being pivotally secured to the first and second brackets.

3. The glare shield as described in claim 2 further comprising:

a magnet positioned upon the upper portion of the first bracket, and a magnet positioned upon the upper portion of the second bracket;

a magnet positioned adjacent the first hinge piece of the glare shield, and a magnet positioned adjacent the second hinge piece of the glare shield;

the magnet of the first hinge piece oriented to be secured to the magnet of the first bracket, additionally the magnet of the second hinge piece oriented to be secured to the magnet of the second bracket, such that the glare shield can be magnetically held in an upright orientation.

4. The glare shield of claim 2 wherein:

the first securing means includes a threaded screw and a bottom plate adjustably positioned upon the threaded screw, the bottom plate being adjusted to engage a lower extent of the rearview mirror; and the second securing means includes a threaded screw and a bottom plate adjustably positioned upon the threaded screw the bottom plate being adjusted to engage the lower extent of the rearview mirror.

* * * * *